United States Patent [19]
Hatae

[11] Patent Number: 5,970,392
[45] Date of Patent: Oct. 19, 1999

[54] INFORMATION SIGNAL PROCESSING APPARATUS AND METHOD

[75] Inventor: Shinichi Hatae, Kawasaki, Japan

[73] Assignee: Canon Kabushiki Kaisha, Tokyo, Japan

[21] Appl. No.: 08/718,863

[22] Filed: Sep. 24, 1996

[30] Foreign Application Priority Data

Sep. 26, 1995 [JP] Japan .................................. 7-247684

[51] Int. Cl.$^6$ .................................................. H04B 7/00
[52] U.S. Cl. .............................. 455/66; 455/93; 370/913
[58] Field of Search .............................. 455/59, 66, 93, 455/103, 272, 277.1, 344, 74, 74.1; 370/913

[56] References Cited

U.S. PATENT DOCUMENTS

| | | |
|---|---|---|
| 3,513,443 | 5/1970 | Andersen . |
| 4,686,490 | 8/1987 | Cressey ...................................... 455/93 |
| 4,912,773 | 3/1990 | Schiff ....................................... 455/103 |
| 5,125,021 | 6/1992 | Lebowitz ................................... 379/59 |
| 5,193,222 | 3/1993 | Sasaki ..................................... 455/103 |
| 5,239,540 | 8/1993 | Rovira et al. .............................. 455/66 |
| 5,579,337 | 11/1996 | Grinstein et al. . |

*Primary Examiner*—Edward F. Urban
*Attorney, Agent, or Firm*—Fitzpatrick, Cella, Harper & Scinto

[57] ABSTRACT

Information signal processing apparatus and method characterized in that an input information signal is converted into a transmission signal in a predetermined form and the converted transmission signal is transmitted by a selected one of a wire transmission and a radio transmission are provided. Information signal processing apparatus and method characterized in that either a wire reception to receive an information signal in a predetermined form through a transmission line or a radio reception to receive an information signal in which the information signal in the predetermined form was modulated and transmitted in a radio manner is selected and the received information signal in the predetermined form is reproduced are provided.

21 Claims, 7 Drawing Sheets

INFORMATION SIGNAL PROCESSING APPARATUS AND METHOD

BACKGROUND OF THE INVENTION

1. Field of the Invention

The invention relates to information signal processing apparatus and method for transmitting and receiving an information signal.

2. Related Background Art

Hitherto, when a plurality of digital information equipment are connected and digital data is serially transmitted, a system according to a wire transmission based on, for example, the SMPTE 125M standard or IEEE 1394 standard is proposed.

In the SMPTE 125M, however, when a plurality of equipment are connected, it is necessary to provide a distributor for one equipment. Since a bidirectional communication is not performed, an individual transmission and reception line needs to be provided for each equipment. Although a connection of (1:1) of the equipment can be easily realized, a hardware increases, its treatment is inconvenient, and costs rise.

In the IEEE 1394, each equipment cannot be connected to a position 4.5 m or more away from another equipment. When a communication at a remote distance is executed, it is necessary to connect a number of equipment each having a repeater function. According to the connection by wire as mentioned above, a wiring process of a large quantity of wire material is needed and a degree of freedom in a system construction is restricted.

SUMMARY OF THE INVENTION

Under such circumstances as mentioned above, it is an object of the invention to provide information signal processing apparatus and method which can easily connect a plurality of information equipment installed at remote distances by selectively transmitting an information signal by wire or in a radio manner.

To accomplish the above object, according to one preferred embodiment, there is provided an information signal processing apparatus (method) comprising: converting means (step) for converting an information signal which is inputted into a transmission signal in a predetermined form; wire transmitting means (step) for transmitting the transmission signal converted by the converting means (step) to a transmission line; radio transmitting means (step) for transmitting the transmission signal converted by the converting means (step) in a radio manner; and selecting means (step) for selecting either the wire transmission or the radio transmission.

According to another preferred embodiment, there is provided an information signal processing apparatus (method) comprising: wire receiving means (step) for receiving an information signal in a predetermined form through a transmission line; radio receiving means (step) for receiving the information signal transmitted in a radio manner by modulating the information signal in the predetermined form; selecting means (step) for selecting either the wire reception or the radio reception; and reproducing means (step) for reproducing the information signal of the predetermined form selected by the selecting means (step).

Other objects, features and advantages of the invention will become apparent from the following detailed description taken in conjunction with the accompanying drawings.

DETAILED DESCRIPTION OF THE PREFERRED EMBODIMENTS

Embodiments according to the invention will now be described hereinbelow.

Figure 1:
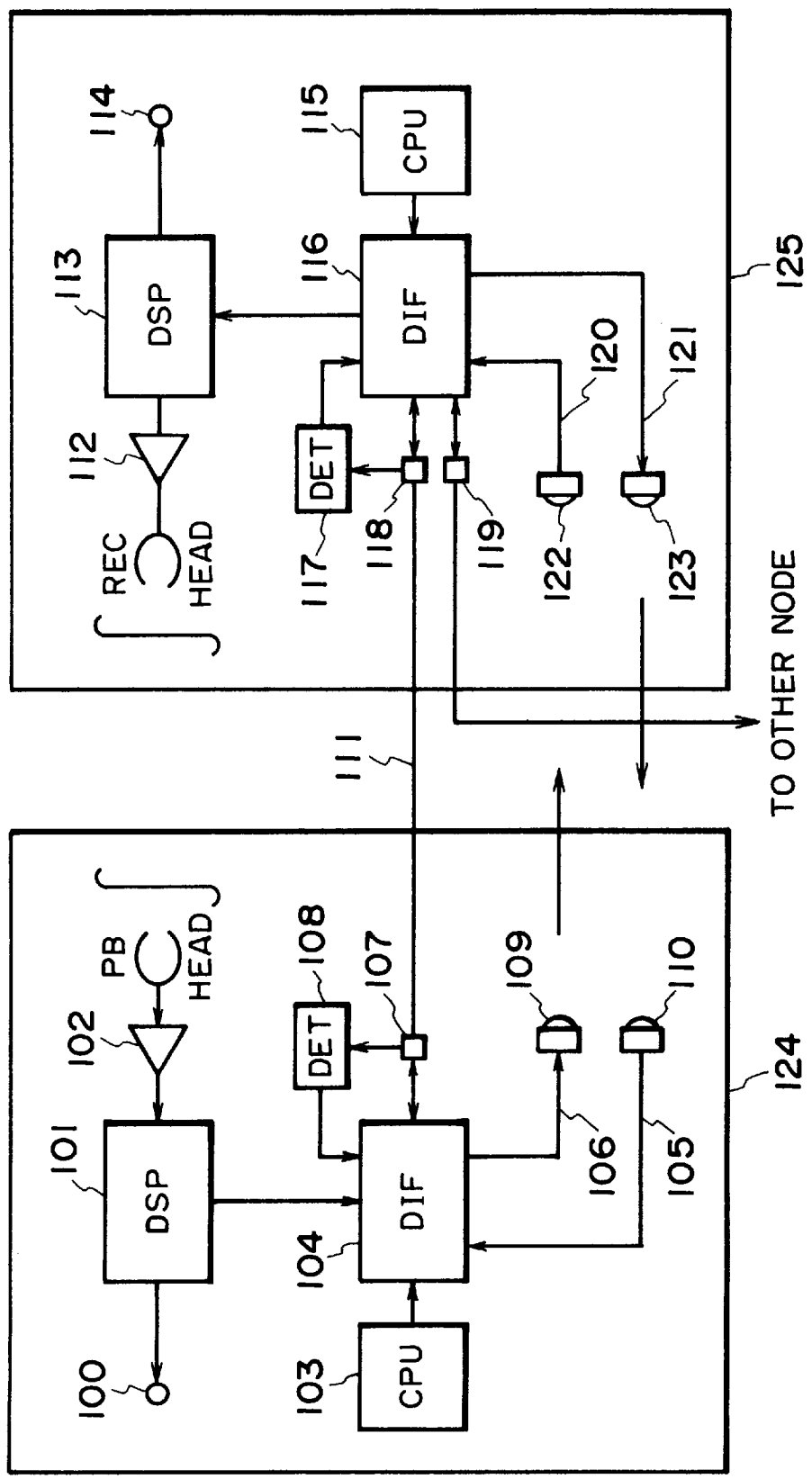
FIG. 1 is a block diagram showing a construction of a digital signal processing system according to the invention.

FIG. 1 is a block diagram showing a construction of a digital signal processing system according to the invention.

According to the digital signal processing system of FIG. 1, two digital information recording and reproducing apparatuses (hereinafter, referred to as SD (standard digital) VTRS) 124 and 125 are used as digital information equipment and a digital signal reproduced by the SDVTR 124 is transmitted to the SDVTR 125 by wire or in a radio manner and is recorded.

Figure 2:
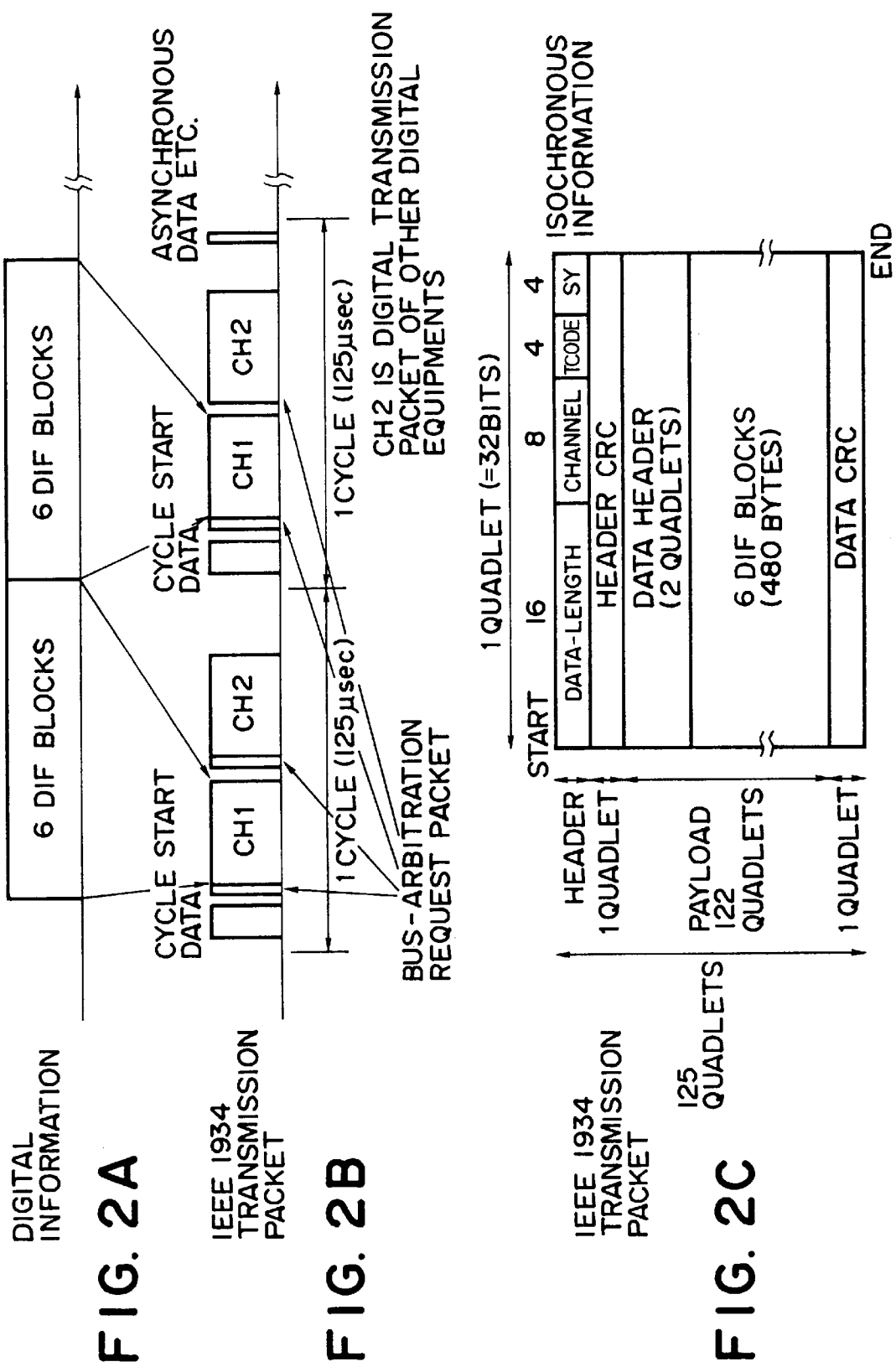
FIGS. 2A to 2C are diagrams showing a transmission example of a packet of a digital signal in the system of FIG. 1.

FIGS. 2A, 2B, and 2C are diagrams showing a transmission example of a packet of the digital signal in the system of FIG. 1.

FIG. 2A shows digital information data obtained by a method whereby encoded information data (for example, encoded image data) recorded on a track of a magnetic tape of the SDVTR is divided into DIF blocks and is converted into a bit stream on a unit basis of six DIF blocks. The digital information data is serially transmitted.

Figure 3:
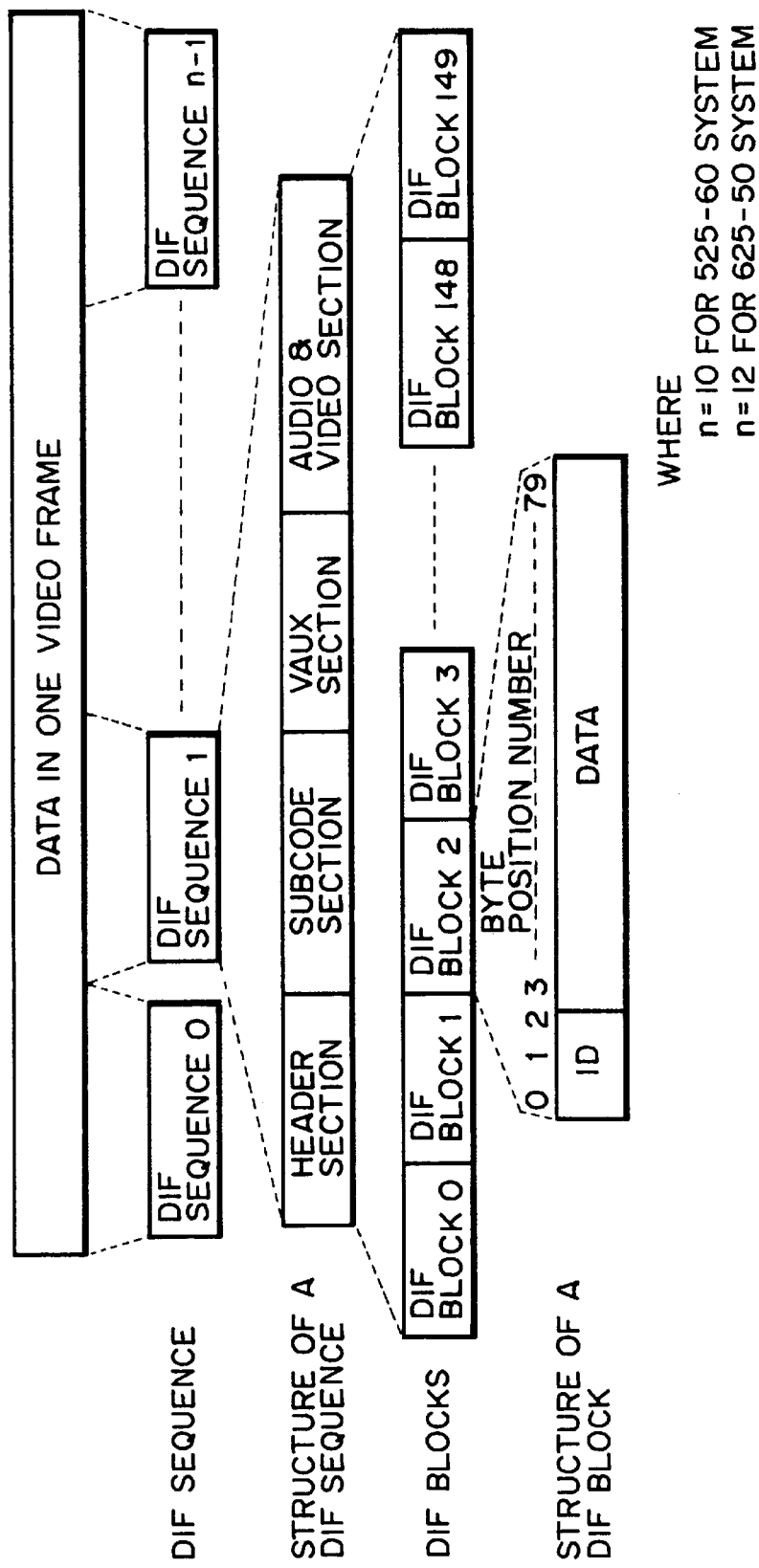
FIG. 3 is a diagram showing a construction of a DIF block.

FIG. 3 shows a construction of the DIF block. One DIF block is constructed by 3 bytes of an ID portion and 77 bytes of a data portion.

Encoded image data recorded on a magnetic tape of the SDVTR is data obtained by a method whereby an inputted image signal is A/D converted and divided into (8×8) pixel blocks and the image data divided into the blocks is subjected to an orthogonal transformation [discrete cosine transform (DCT)], is quantized, and is Huffman encoded.

FIG. 2B shows a transmission pattern in a physical layer of the IEEE 1394. In FIG. 2B, ch1 and ch2 denote DIF blocks from different nodes. In an Isochronous transmission of each block, a bus-arbitration is requested to a bus-manager and data is sequentially transmitted.

The physical layer of the IEEE 1394 determines an encoding method of a serial signal and an electrical specification of the signal. Specific roles are as follows.

(1) When a power source is turned on or a new apparatus is connected or when the apparatus is disconnected, a system construction is automatically set.

(2) A bus arbitration is executed.

(3) A situation of traffic is informed to the whole bus. A signal sent from a certain port is also certainly informed to another port.

The Isochronous transmission is a transmission in which a data transfer is completed within a predetermined time. A transmitting procedure of the Isochronous itself is omitted here.

FIG. 2C shows a packet of the IEEE 1394. The packets are sequentially read out from Start to End and a bit stream is formed.

In FIG. 2C,

Data_length: Specifies the length of the data field of the isochronous packet in bytes.

Channel: Specifies the isochronous channel number for the packet.

Tcode: Specifies the packet format and the type of transaction that shall be performed.

Sy: Application-specific control field.

Returning to the explanation of FIG. 1, in the SDVTR 124 on the transmitting side, the encoded information data reproduced from the magnetic tape by a reproducing head (PB HEAD) is transmitted through a reproducing amplifier 102 and is processed by DSP unit 101. The information data subjected to predetermined processes in the DSP unit 101 is outputted from an output terminal 100 and is also sent to a DIF unit 104 on a unit basis of six DIF packets.

In a wire mode, the information data which was processed and packetized as will be explained hereinlater in the DIF unit 104 is outputted from an input/output terminal 107 of the IEEE 1394 as shown in FIG. 2B mentioned above. In a radio mode, the bit stream data taken out from the front stage of a data/strobe modulator in the DIF unit 104 is transmitted from a radio transmitting unit 109 through a transmission line 106.

A cable 111 by the IEEE 1394 is connected between the input/output terminal 107 of the SDVTR 124 and an input/output terminal 118 of the SDVTR 125. Detectors 108 and 117 detect the connection of the cable 111 and notify the DIF units 104 and 116.

In the SDVTR 125 on the receiving side, the signal received at the input/output terminal 118 of the IEEE 1394 through the cable 111 or the information data received through a transmission line 120 from a radio receiving unit 122 is processed and packetized by a control of a CPU 115 in a DIF unit 116.

The packetized information data is sent to another node (equipment) from another output terminal 119 of the IEEE 1394 and is also sent to a DSP unit 113. The information data subjected to predetermined processes in the DSP unit 113 is outputted from an output terminal 114 and is also recorded onto the magnetic tape by a recording head (REC HEAD) through a recording amplifier 112.

I will be obviously understood that the SDVTR 125 may be set to the transmitting side and the SDVTR 124 is set to the receiving side. In this case, the signal processed by a DIF unit 116 is transmitted from a radio transmitting unit 123 through a transmission line 121 and is received by a radio receiving unit 110 and is sent to the DIF unit 104 through a transmission line 105. Or, the signal processed by the DIF unit 116 is received at the input/output terminal 107 from the input/output terminal 118 through the cable 111 and is sent to the DIF unit 104.

Figure 4:
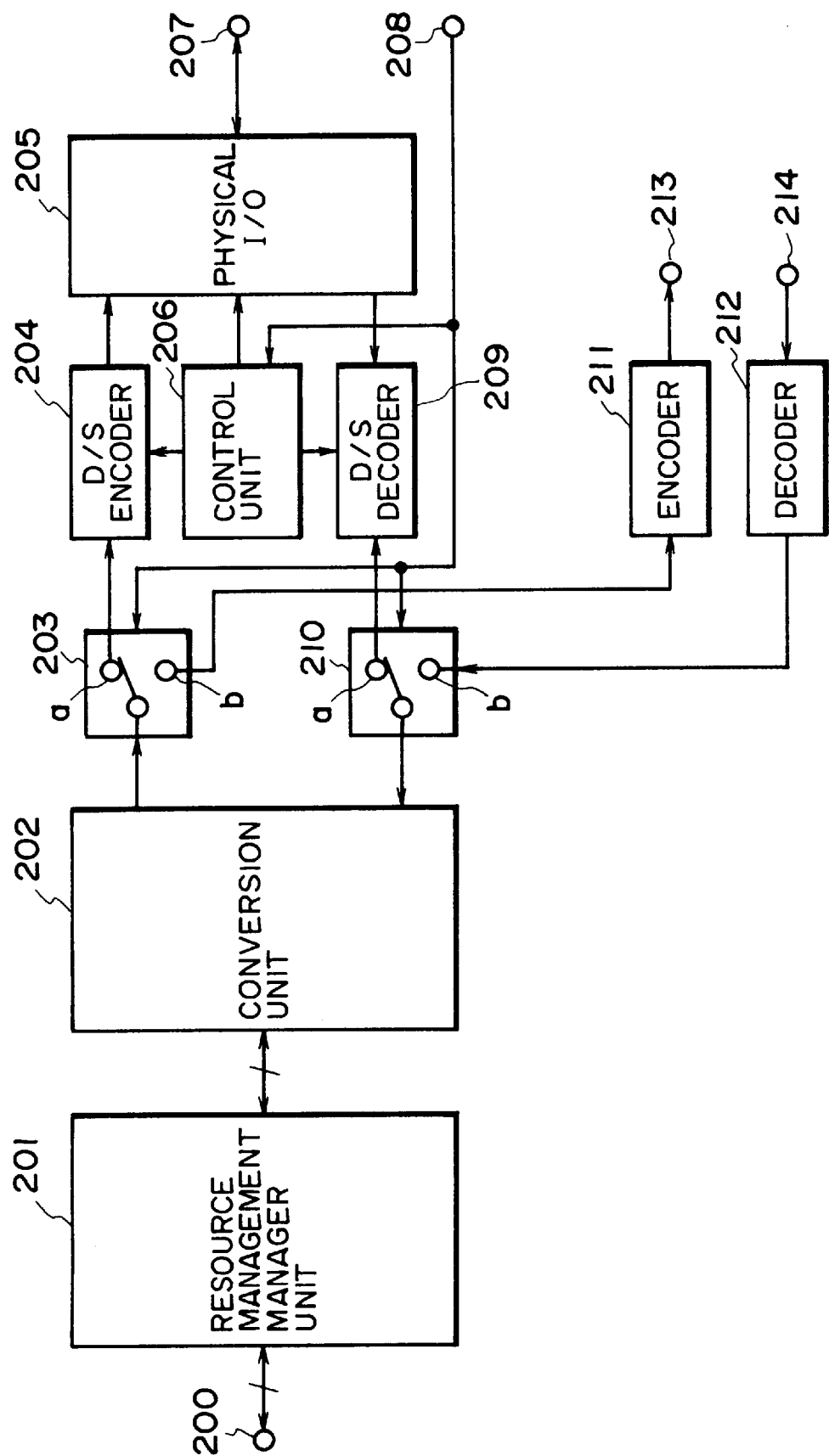
FIG. 4 is a detailed block diagram of DIF units 104 and 116 in FIG. 1.

FIG. 4 is a detailed block diagram of the DIF unit 104 or 116 in FIG. 1.

Upon transmission, in the wire mode, a control signal is inputted to a control terminal 208 by a CPU 103 or 115 in FIG. 1, so that a switch 203 is connected to the (a) side. The information data as parallel data inputted from an input/output terminal 200 is subjected to a packetization necessary for the IEEE 1394 shown in FIG. 2C by a resource management manager unit 201.

The packetized signal is converted into serial data by a P/S and S/P conversion unit 202. After that, the serial data is inputted to a data/strobe encoder (D/S encoder) 204 through the switch 203. The bit stream data is modulated into a data signal and a strobe signal. After that, the data/strobe signals are outputted from an input/output terminal 207 through a physical layer (I/O) 205 by the IEEE 1394.

Processes in the D/S encoder 204 will now be described in detail.

In the IEEE 1394, an encoding method called a DS Link (Data/Strobe Link) is used.

Figure 5:
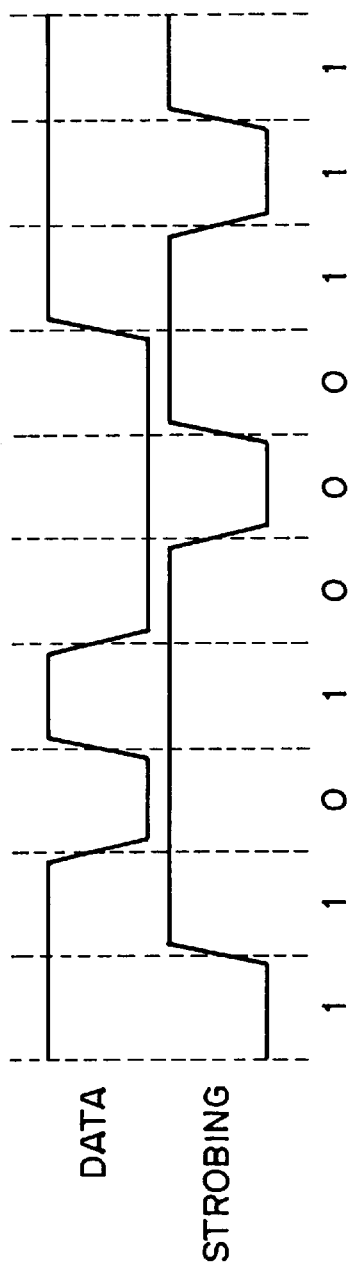
FIG. 5 is a diagram for explaining a DS Link method.

In the DS Link, two signal lines are necessary. One of the signal lines is used as a data signal line and the other is used as a strobe signal line. When the data of the same value is continuously transmitted, a state of the strobe signal changes. When the value of the data changes, the state of the strobe signal is not changed (refer to FIG. 5).

In the radio mode, the switch 203 is switched to the (b) side. The bit stream from the conversion unit 202 is modulated by an encoder 211 through the switch 203. After that, it is transmitted from a transmission terminal 213 through the radio transmitting unit 109 or 123 in FIG. 1.

The radio transmitting unit 109 or 123 converts the input data into a transmission frequency signal having a proper center frequency and transmits.

The embodiment uses a spread spectrum communication as a radio communication. According to the spread spectrum communicating method, a base band signal having a band width that is much wider than that of the original data is produced by using diffusion code series such as a pseudo noise code or the like from a base band signal of a digital signal which is ordinarily transmitted. Further, a modulation such as PSK (phase shift keying), FSK (frequency shift keying), or the like is executed and the transmission signal is converted into an RF (radio frequency) signal and is transmitted. In the embodiment, a code division multiplexing method is used in order to enable a high speed transmission of data by the spread spectrum communication.

Figure 6:
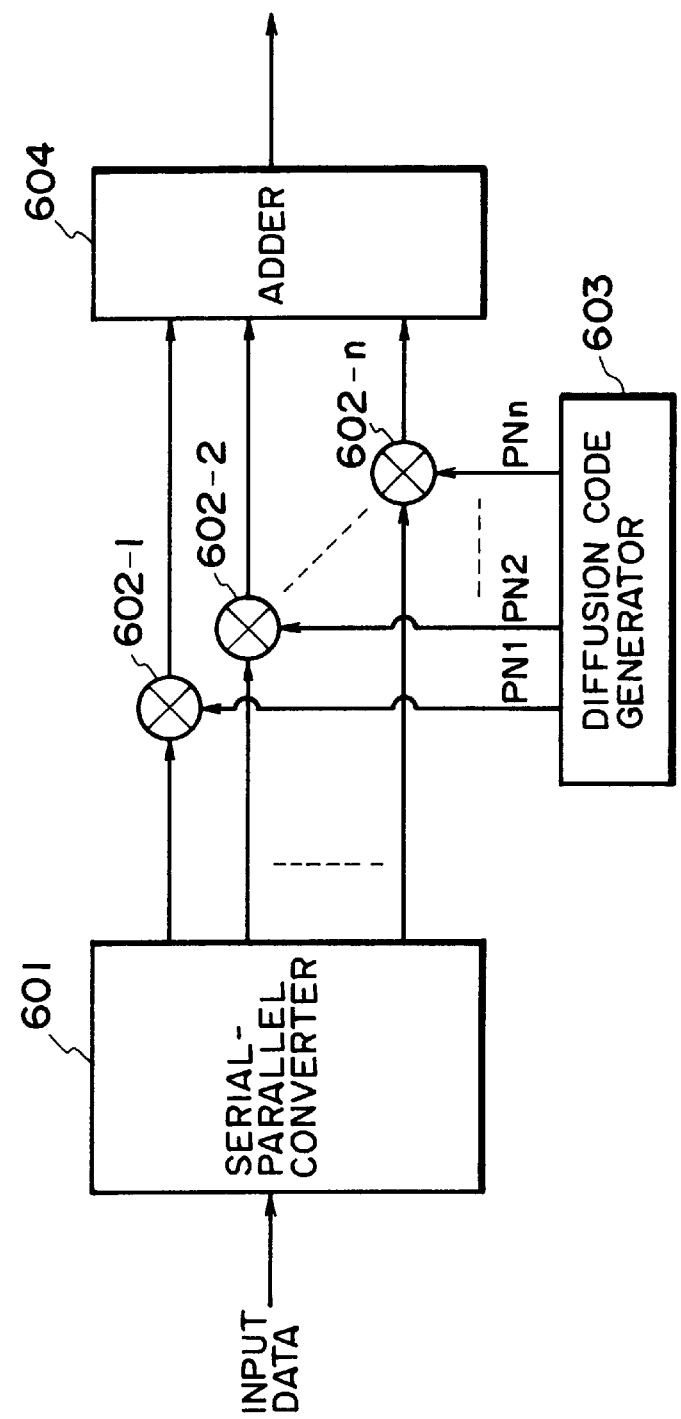
FIG. 6 is a detailed block diagram of an encoder 211 in FIG. 4

FIG. 6 shows a specific construction of the encoder 211.

In FIG. 6, reference numeral 601 denotes a serial/parallel converter; 602-1 to 602-n multipliers; 603 a diffusion code generator; and 604 an adder.

The operation of the encoder 211 constructed as mentioned above will now be described.

The information data inputted to the encoder 211 is converted into (n) parallel data by the S/P converter 601. In the (n) multipliers 602-1 to 602-n, the converted data is multiplied to (n) different diffusion code outputs generated from the diffusion code generator 603 and is converted into wide band diffusion signals of (n) channels, respectively. Outputs of the multipliers are added by the adder 604 and the result is outputted.

The resource management manager unit 201 and conversion unit 202 execute a bidirectional communication and are also used upon reception. Namely, at the time of the reception, in the wire mode, a switch 210 is connected to the (a) side by a control signal. A digital signal which is inputted from the input/output terminal 207 and comprises the data signal and strobe signal is demodulated by a D/S decoder 209 through the physical I/O 205. The demodulated signal is converted into parallel data by the conversion unit 202 through the switch 210. After that, processes such that the data is depacketized and the like are executed by the resource management manager unit 201 and the resultant data is outputted from the input/output terminal 200.

In the radio mode, the switch 210 is switched to the (b) side. The digital signal received by the radio receiving unit 110 or 122 in FIG. 1 is received at a reception terminal 214 and is demodulated by a decoder 212. After that, the demodulated signal is sent to the conversion unit 202 through the switch 210. The subsequent processes are executed in a manner similar to those mentioned above.

Figure 7:
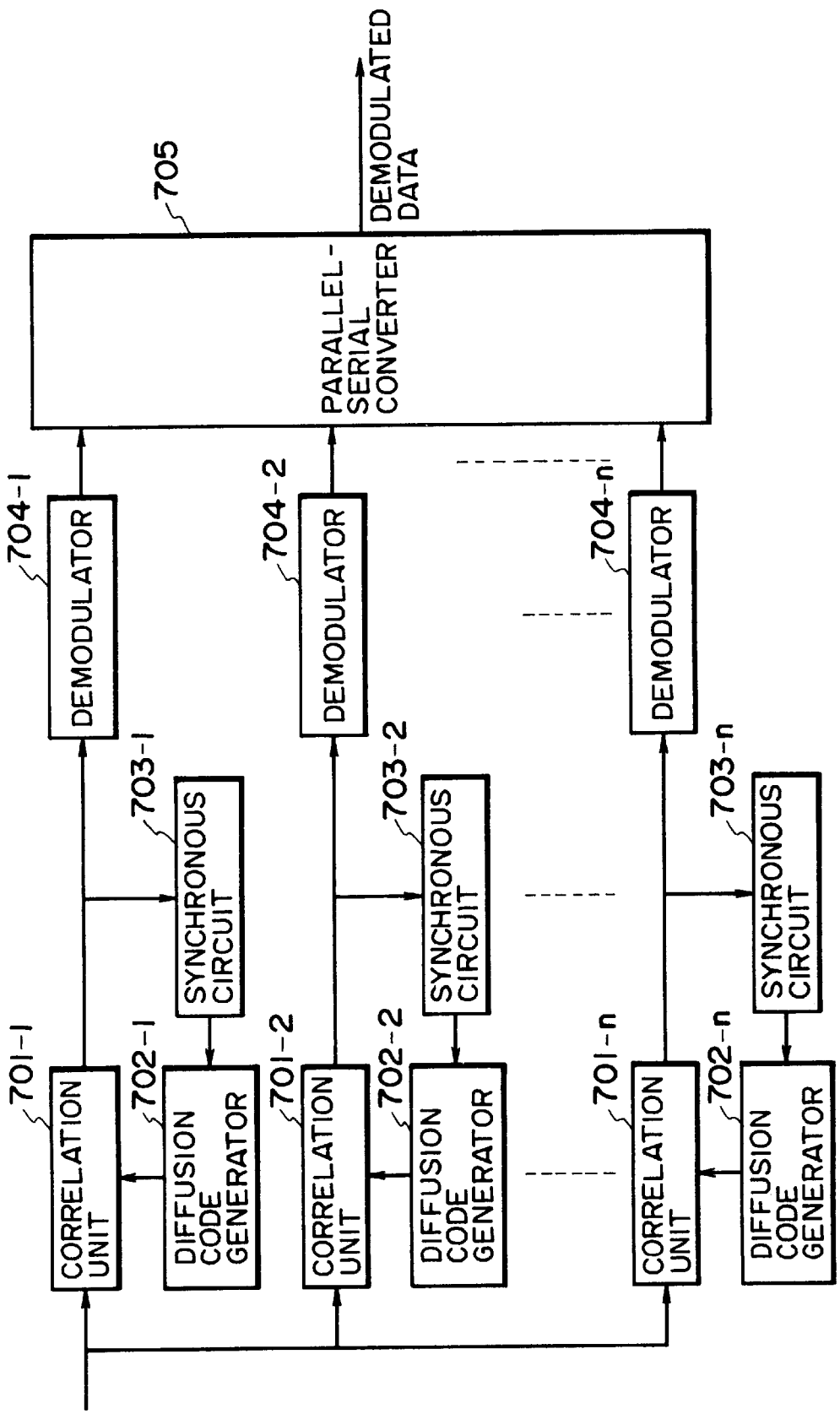
FIG. 7 is a detailed block diagram of a decoder 212 in FIG. 4.

FIG. 7 shows a specific construction of the decoder 212.

In FIG. 7, reference numerals 701-1 to 701-n denote correlation units; 702-1 to 702-n diffusion code generators; 703-1 to 703-n synchronous circuits; 704-1 to 704-n demodulators; and 705 a parallel/serial converter.

The operation of the decoder 212 constructed as mentioned above will now be described.

The data which was properly filtered and amplified and converted into the intermediate frequency signal by the radio receiving unit 110 or 122 is inputted to the decoder 212.

Correlations between the input data and outputs of the diffusion code generators 702-2 to 702-n corresponding to the channels are detected by the correlation units 701-1 to 701-n and an inverse diffusion is performed. In the inverse diffusion, signals are synchronized in every channel by the synchronous circuits 703-1 to 703-n, thereby making the code phases of the diffusion code generators and the clocks coincide. The inverse diffusion signals are demodulated by the demodulators 704-1 to 704-n. The demodulated data is converted into the serial data by the P/S converter 705 and the original information data is reproduced.

The D/S encoder 204 and D/S decoder 209 are controlled by a control unit 206 in accordance with a control signal from the control terminal 208.

Figure 8:
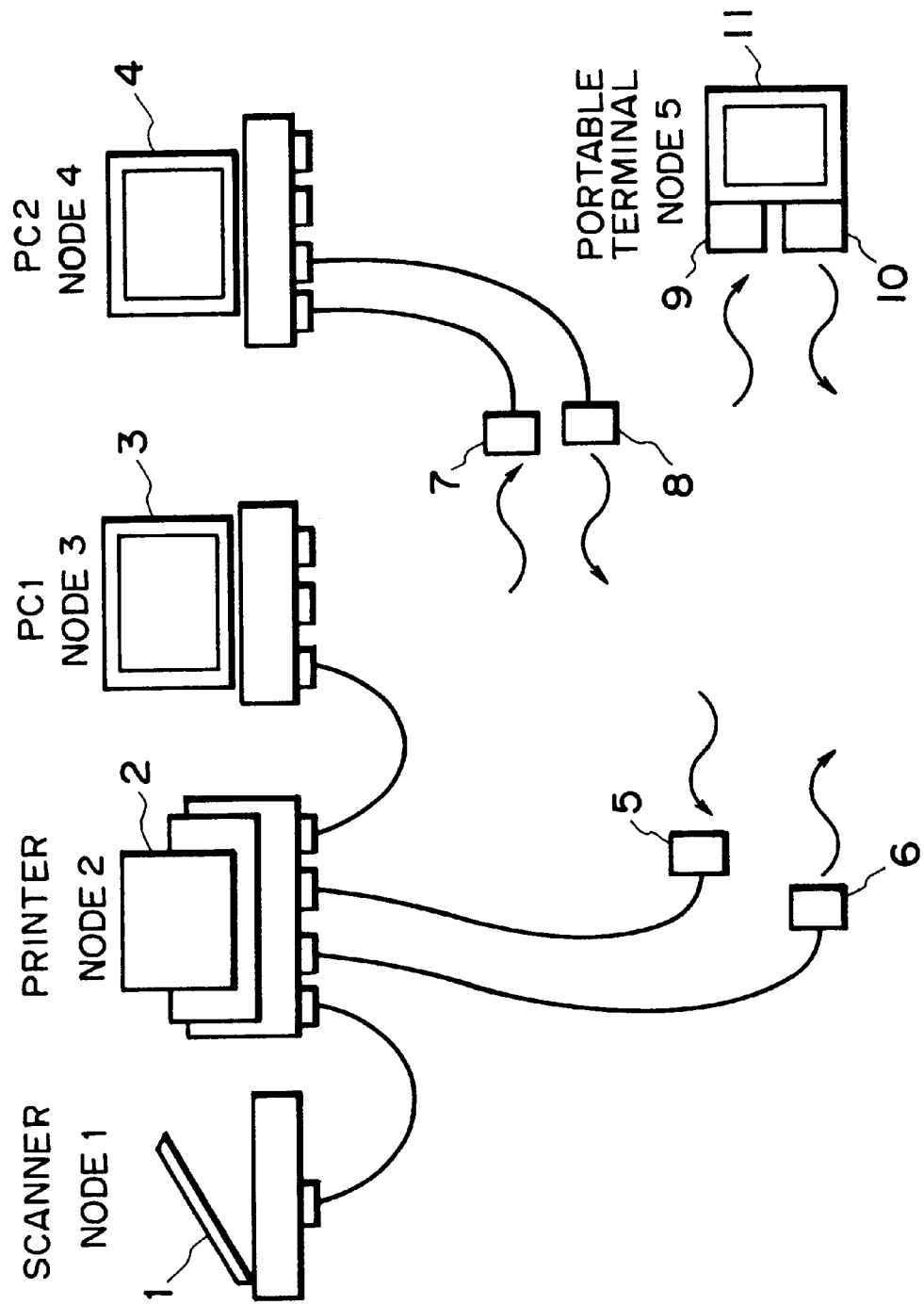
FIG. 8 is a diagram showing a constructional example when the invention is applied to a system to which a plurality of digital information equipment are connected.

FIG. 8 is a diagram showing a constructional example a system to which five digital information equipments connected by using the DIF unit in FIG. 4.

In FIG. 8, a scanner 1, a printer 2, a personal computer 3 (PC1), a personal computer 4 (PC2), and a portable terminal 11 are used as five equipments.

It is now assumed that the above five equipments are referred to as nodes 1 to 5. The printer 2 is connected to the scanner 1 and personal computer 3 by wires. The printer 2, personal computer 4, and portable terminal 11 are connected in a radio manner.

Therefore, a radio receiving unit 5 and a radio transmitting unit 6 are provided for the printer 2. A radio receiving unit 7 and a radio transmitting unit 8 are provided for the personal computer 4. Further, a radio receiving unit 9 and a radio transmitting unit 10 are provided for the portable terminal 11. Therefore, the DIF unit is provided for each of the printer 2, personal computer 4, and portable terminal 11.

Each of the equipments is connected by the IEEE 1394 by a wire and all of them conform with the IEEE 1394.

According to the embodiment as mentioned above, a plurality of digital information equipments can be easily connected at a remote distance. Particularly, since the equipment can be connected irrespective of the connecting conditions of the wires among the equipment, a degree of freedom in the system construction is improved.

Since a part of the circuit can be shared by a wire and a radio, when an LSI is formed, circuit construction is simplified, chip area can be reduced, restriction of the hardware decreases, and the costs can be reduced.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information signal processing apparatus, comprising:
    a) conversion means for packetizing an inputted information and additional information to a transmission packet of a predetermined format and converting the transmission packet to a transmission signal;
    b) wire transmitting means for transmitting the transmission signal supplied by said conversion means to a transmission line;
    c) radio transmitting means for transmitting the transmission signal supplied by said conversion means to a radio transmission line; and
    d) transmission mode selecting means for selecting either said wire transmitting means or said radio transmitting means according to a transmission mode designating signal,
    wherein each of the transmission signal supplied to said wire transmitting means and the transmission signal supplied to said radio transmitting means is generated from the transmission packet of a common format.

2. An apparatus according to claim 1, wherein the information signal is parallel data, the transmission signal is serial data, and said converting means includes parallel/serial converting means for converting the parallel data into serial data.

3. An apparatus according to claim 1, wherein said wire transmitting means encodes the transmission signal to a data signal and a strobe signal.

4. An apparatus according to claim 1, wherein said radio transmitting means executes a spread spectrum modulation for the transmission signal.

5. An apparatus according to claim 1, further comprising receiving means for receiving a a transmission signal through the transmission line.

6. An apparatus according to claim 1, further comprising receiving means for receiving a transmission signal through the radio transmission line.

7. An apparatus according to claim 5, wherein the transmission signal received by said receiving means is transferred to other device through said wire transmitting means.

8. An apparatus according to claim 6, wherein the transmission signal received by said receiving means is transferred to other device through said radio transmitting means.

9. An apparatus according to claim 1, wherein the information signal includes an image signal.

10. An apparatus according to claim 1, wherein the transmission packet is a packet based on an isochronous transmission method of IEEE 1394 standard.

11. An apparatus according to claim 1, wherein said radio transmitting means or said wire transmitting means executed an isochronous transmission for the transmission signal.

12. An apparatus according to claim 1, wherein said apparatus is an image reproducing apparatus.

13. An information signal processing apparatus comprising:
    a) wire receiving means for receiving a transmission signal, the transmission signal being generated from a transmission packet of a predetermined format composed of an information signal and additional information, through a wire transmission line;
    b) radio receiving means for receiving a transmission signal, the transmission signal being generated from a transmission packet of a format in common with the transmission of the predetermined format, through a radio transmission line;

c) receiving mode selecting means for selecting either said wire receiving means or said radio receiving means according to a receiving mode designating signal; and d) conversion means for converting the transmission signal supplied from said wire receiving means and the transmission signal supplied from said radio receiving means to the transmission packet and packetizing the transmission packet.

14. An apparatus according to claim 13, wherein said wire receiving means receives transmission signal encoded to a data signal and a strobe signal.

15. An apparatus according to claim 14, wherein said radio receiving means receives a signal which was spread spectrum modulated.

16. An apparatus according to claim 13, wherein the information signal includes an image signal.

17. An apparatus according to claim 13, wherein the transmission packet is a packet based on an isochronous transmission method of IEEE 1394 standard.

18. An apparatus according to claim 13, wherein said radio receiving means or said wire receiving means receives an isochronous-transmitted transmission signal.

19. An apparatus according to claim 13, wherein said apparatus is an image reproducing apparatus.

20. An information signal processing method comprising:
   a) a converting step of packetizing an inputted information signal and additional information to a transmission packet of a predetermined format and converting the transmission packet to a transmission signal;
   b) a wire transmitting step of transmitting the transmission signal supplied by said converting step to a transmission line;
   c) a radio transmitting step of transmitting the transmission signal supplied by said converting step to a radio transmission line; and
   d) a transmission mode selecting step of selecting either said wire transmission or said radio transmission according to a transmission mode designating signal, wherein each of the transmission signal supplied to said wire transmitting step and the transmission signal supplied to said radio transmitting step is generated from the transmission packet of a common format.

21. An information processing method comprising:

a) a wire receiving step of receiving a transmission signal, the transmission signal being generated from a transmission packet of a predetermined format composed of an information signal and additional information, through a wire transmission line;

b) a radio receiving step of receiving a transmission signal, the transmission signal being generated form a transmission packet of a format in common with the transmission of the predetermined format, through a radio transmission line;

c) a receiving mode selecting step of selecting either said wire reception or said radio reception according to a receiving mode designating step; and d) a converting step of converting the transmission signal supplied from said wire receiving step and the transmission signal supplied from said radio receiving step to the transmission packet and packetizing the transmission packet.

* * * * *

UNITED STATES PATENT AND TRADEMARK OFFICE
CERTIFICATE OF CORRECTION

PATENT NO. : 5,970,392
DATED     : October 19, 1999
INVENTOR(S) : SHINICHI HATAE It is certified that error appears in the above-identified patent and that said Letters Patent is hereby corrected as shown below:

COLUMN 1

Line 10, "are" should read --is--;
   Line 15, "are" should read --is--;
   Line 20, "a" should be deleted;
   Line 25, "equipment" should read --units of equipment--.

COLUMN 2

Line 10, "FIG. 4" should read --FIG. 4;--;
   Line 15, "are" should read --units are--;
   Line 51, "Isochronous" should read --isochronous--;
   Line 64, "Isochronous" should read --isochronous--;
   Line 66, "Isochronous" should read --isochronous--.

COLUMN 6

Line 22, "the infor-" should be deleted;
   Line 23, "mation signal is parallel data" should be deleted;
   Line 25, "parallel data" should read --transmission packet--;
   Line 42, "other" should read --another--;
   Line 45, "other" should read --another--;
   Line 66, "transmission" should read --transmission packet--.

COLUMN 7

Line 8, "packetizing" should read --depacketizing--;

UNITED STATES PATENT AND TRADEMARK OFFICE
CERTIFICATE OF CORRECTION

PATENT NO.    : 5,970,392
DATED         : October 19, 1999
INVENTOR(S)   : SHINICHI HATAE It is certified that error appears in the above-identified patent and that said Letters Patent is hereby corrected as shown below:

COLUMN 8

Line 7, "signal" should read --signals;
Line 20, "form" should read --from--;
Line 22, "transmission" should read --transmission packet--;
Line 31, "packetizing" should read --depacketizing--.

Signed and Sealed this

Third Day of April, 2001

Attest:

NICHOLAS P. GODICI

Attesting Officer

Acting Director of the United States Patent and Trademark Office